(12) United States Patent
George et al.

(10) Patent No.: US 11,773,977 B2
(45) Date of Patent: Oct. 3, 2023

(54) BIMETALLIC SEAL

(71) Applicant: SAINT-GOBAIN PERFORMANCE PLASTICS CORPORATION, Solon, OH (US)

(72) Inventors: Douglas George, Trumbull, CT (US); Mark W. Armitage, Madison, CT (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 0 days.

(21) Appl. No.: 17/364,090

(22) Filed: Jun. 30, 2021

(65) Prior Publication Data

US 2022/0010881 A1    Jan. 13, 2022

Related U.S. Application Data

(60) Provisional application No. 63/049,394, filed on Jul. 8, 2020.

(51) Int. Cl.
*F16J 15/08* (2006.01)
*F16J 15/02* (2006.01)

(52) U.S. Cl.
CPC ......... *F16J 15/0806* (2013.01); *F16J 15/022* (2013.01)

(58) Field of Classification Search
CPC .. F16J 15/02; F16J 15/022; F16J 15/08; F16J 15/0806
See application file for complete search history.

(56) References Cited

U.S. PATENT DOCUMENTS

| | | | |
|---|---|---|---|
| 4,813,608 A | 3/1989 | Holowach et al. | |
| 5,158,305 A * | 10/1992 | Hailing | F16L 17/067 277/647 |
| 5,630,593 A * | 5/1997 | Swensen | F16J 15/0887 277/626 |
| 6,199,871 B1 | 3/2001 | Lampes | |
| 7,025,360 B2 | 4/2006 | Walker et al. | |
| 7,090,224 B2 * | 8/2006 | Iguchi | F01D 11/005 277/637 |
| 7,384,494 B2 | 6/2008 | Kosty et al. | |

(Continued)

FOREIGN PATENT DOCUMENTS

KR    20160072729 A    6/2016

OTHER PUBLICATIONS

International Search Report and Written Opinion for PCT/US2021/039903, dated Oct. 15, 2021, 11 pages.

*Primary Examiner* — Gilbert Y Lee
(74) *Attorney, Agent, or Firm* — Abel Schillinger, LLP; Ann Palma

(57) ABSTRACT

Systems and methods include providing an annular bimetallic seal for an assembly. The bimetallic seal includes a first sealing component formed from a first material, a second sealing component formed from a second material that is different than the first material, and a joint formed between the first sealing component and the second sealing component. The bimetallic seal is configured to form a radial seal between a first assembly component and a second assembly component formed from dissimilar metallic materials. The coefficient of thermal expansion (CTE) of the first material and the second material are configured maintain the radial seal at extreme operating temperatures between the dissimilar metallic materials of the components of the assembly.

18 Claims, 11 Drawing Sheets

(56) References Cited

U.S. PATENT DOCUMENTS

| | | |
|---|---|---|
| 10,113,437 B2 * | 10/2018 | Davis .................. F16J 15/0887 |
| 10,344,609 B2 * | 7/2019 | Davis .................... F01D 11/003 |
| 2007/0210536 A1 | 9/2007 | Paauwe |
| 2008/0136179 A1 | 6/2008 | Minford |
| 2009/0155671 A1 | 6/2009 | Reytier et al. |
| 2013/0105105 A1 | 5/2013 | O'Brien |
| 2018/0131124 A1 | 5/2018 | Matlack et al. |

* cited by examiner

_US 11,773,977 B2_

BIMETALLIC SEAL

CROSS-REFERENCE TO RELATED APPLICATIONS

This application claims priority under 35 U.S.C § 119(e) to U.S. Provisional Application No. 63/049,394, entitled "BIMETALLIC SEAL," by Douglas GEORGE et al., filed on Jul. 8, 2020, the disclosure of which is assigned to the current assignee hereof and incorporated herein by reference in its entirety for all purposes.

BACKGROUND OF THE INVENTION

Seals are used in many industrial applications to prevent leakage between components of an assembly. Advancements in high temperature aerospace and motorsport applications increasingly use mating components that are formed from dissimilar materials having dissimilar thermal expansion properties. When subjected to the high temperatures in these applications, traditional metallic seals formed from a homogeneous metallic material may become over-compressed or under-compressed on an inner diameter or outer diameter of the seal due to the difference in thermal expansion properties of the mating components, thereby resulting in leakage upon cooling. Accordingly, the industry continues to demand improvements in seal technology for such applications.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
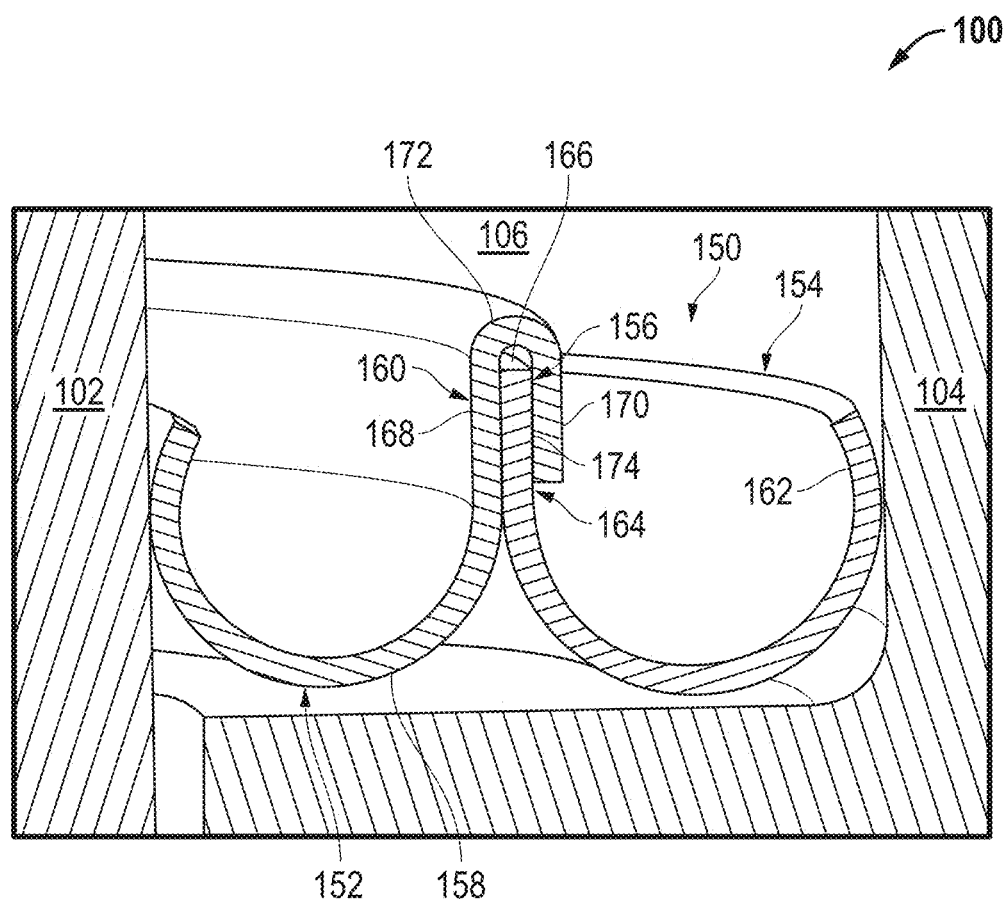
FIG. 1 is a cross-sectional view of an assembly having an annular bimetallic seal according to an embodiment of the disclosure.

FIG. 1 is a partial cross-sectional view of an assembly 100 having an annular bimetallic seal 150 according to an embodiment of the disclosure. In some embodiments, the assembly 100 may comprise an engine duct assembly or exhaust components of an aerospace engine. In other embodiments, the assembly 100 may comprise a turbo and exhaust component, or exhaust components of an automotive engine. In yet other embodiments, the assembly 100 may comprise a ground-based power turbine oil-mist system. In alterative embodiments, the assembly 100 may comprise any other suitable application requiring a fluid tight seal. The assembly 100 may generally comprise a first assembly component 102 and a second assembly component 104. The first assembly component 102 may generally define inner diameter (ID) of an annulus 106. In some embodiments, the first assembly component 102 may comprise a probe, a shaft, or an inner tube. The second assembly component 104 may generally be disposed annularly about the first assembly component 102 and define an outer diameter (OD) of the annulus 106. In some embodiments, the second assembly component 104 may comprise a housing or an outer tube.

Advancements in high temperature applications may increasingly use mating components that are formed from dissimilar materials that have dissimilar thermal expansion properties. In some embodiments, the first assembly component 102 may generally be formed from a first metallic material, and the second assembly component 104 may be formed from a second metallic material that is different than the first metallic material. Accordingly, the coefficient of thermal expansion (CTE) of the first metallic material that forms the first assembly component 102 may be different than the CTE of the second metallic material that forms the second assembly component 104. In some embodiments, the CTE of the first metallic material may be greater than the CTE of the second metallic material. However, in other embodiments, the CTE of the first metallic material may be less than the CTE of the second metallic material. In a particular embodiment, the first metallic material may comprise steel or stainless steel. As such, the CTE of the first metallic may be about 8.5 in/in-° F. (15.3 cm/cm-° C.), about 8.75 in/in-° F. (15.75 cm/cm-° C.), about 9 in/in-° F. (16.2 cm/cm-° C.), about 9.25 in/in-° F. (16.65 cm/cm-° C.), about 9.5 in/in-° F. (17.1 cm/cm-° C.), about 9.75 in/in-° F. (17.55 cm/cm-° C.), or about 10 in/in-° F. (18.0 cm/cm-° C.). In a particular embodiment, the second metallic material may comprise titanium or a titanium alloy. As such, the CTE of the second metallic material may be about 4 in/in-° F. (7.2 cm/cm-° C.), about 4.25 in/in-° F. (7.65 cm/cm-° C.), about 4.5 in/in-° F. (8.1 cm/cm-° C.), about 4.75 in/in-° F. (8.55 cm/cm-° C.), or about 5 in/in-° F. (9.0 cm/cm-° C.).

The annular bimetallic seal 150 may generally be disposed within the annulus 106 and between the first assembly component 102 and the second assembly component 104. In some embodiments, the seal 150 may comprise an interference fit between the first assembly component 102 and the second assembly component 104. Further, the seal 150 may be configured to provide a radial seal between the first assembly component 102 and the second assembly component 104. The seal 150 may generally comprise a first sealing component 152, a second sealing component 154, and a joint 156 formed between the first sealing component 152 and the second sealing component 154. Accordingly, the first sealing component 152 may be configured to form a radial seal with a first assembly component 102, while the second sealing component 154 is configured to form a radial seal with a second assembly component 104.

The first sealing component 152 may generally comprise an arcuate portion 158 that forms the radial seal with the first assembly component 102 and a joint feature 160. The second sealing component 154 may generally comprise an arcuate portion 162 that forms the radial seal with the second assembly component 104 and a joint feature 164. In some embodiments, the joint feature 160 of the first sealing component 152 may comprise a joint cavity 166 comprising opposing linear legs 168, 170 joined by an arcuate bend 172, and the joint feature 164 of the second sealing component 154 may comprise a joint leg 174 received within the joint cavity 166 to form the joint 156. In some embodiments, the joint leg 174 may be linear. Further, in some embodiments, the joint leg 174 may extend substantially axially with respect to the annulus 106. However, in alternative embodiments, the joint features 160, 164 may be reversed such that the first sealing component 152 comprises the joint feature 164, and the second sealing component 154 comprises the joint feature 160.

In some embodiments, one or more of the first sealing component 152 and the second sealing component 154 may be 3D printed or formed by any other suitable process. The joint 156 may generally be formed such that there is no leakage path between the first sealing component 152 and the second sealing component 154. In some embodiments, the joint 156 may be formed by 3D printing the first sealing component 152 and the second sealing component 154 such that the joint leg 174 of the second sealing component 154 is inserted into the joint cavity 166 of the first sealing component 152. In some embodiments, the joint 156 may be formed by physically inserting the joint leg 174 of the second sealing component 154 into the joint cavity 166 of the first sealing component 152 and then subjecting the joint to one or more joint forming processes, such as ultrasonic welding, laser sintering, mechanical crimping, cold rolling (coulomb bonding), braising, or a combination thereof. In some embodiments, upon inserting the joint leg 174 into the joint cavity 166 and prior to performing the joint forming process, the joint leg 174 may be in contact with one or more of the opposing linear legs 168, 170 of the joint cavity 166. Further, in some embodiments, the joint 156 may be formed by ultrasonic welding, laser sintering, mechanical crimping, cold rolling (coulomb bonding), braising, 3D printing, or any combination thereof.

Forming a seal between differing metallic materials poses unique challenges at high operating temperatures since traditional metallic seals formed from a homogeneous metallic material may become over-compressed on an inner diameter or outer diameter of the seal due to the difference in thermal expansion properties of the mating components 102, 104 of the assembly 100. However, in some embodiments, the seal 150 may be formed from a bimetallic construction to compensate for the difference in thermal expansion properties of the respective mating components 102, 104 of the assembly 100.

Accordingly, in some embodiments, the first material of the first sealing component 152 may be a metallic material, and the second material of the second sealing component 154 may be a metallic material. Further, in some embodiments, the first material of the first sealing component 152 may be different than the second material of the second sealing component 154. By having a bimetallic seal with sealing components 152, 154 formed from different materials, the coefficient of thermal expansion (CTE) of the first material of the first sealing component 152 may be different than the CTE of the second material of the second sealing component 154. For example, in some embodiments, where the CTE of the first metallic material of the first assembly component 102 is greater than the CTE of the second metallic material of the second assembly component 104, the CTE of the first material of the first sealing component 152 may be greater than the CTE of the second material of the second sealing component 154. However, in embodiments where the CTE of the first metallic material of the first assembly component 102 is lower than the CTE of the second metallic material of the second assembly component 104, the CTE of the first material of the first sealing component 152 may be lower than the CTE of the second material of the second sealing component 154.

In some embodiments, the CTE of the first material of the first sealing component 152 may be lower than the CTE of the first metallic material of the first assembly component 102 and greater than the CTE of the second metallic material of the second assembly component 104. In some embodiments, the first material of the first sealing component 152 may comprise a nickel-chromium based alloy such as Inconel®, a nickel-based alloy, nickel, titanium, or tungsten. Accordingly, the first material of the first sealing component 152 may be configured to expand and/or contract at a similar or relative rate with respect to the first metallic material of the first assembly component 102.

In some embodiments, the CTE of the first material of the first sealing component 152 may be the same as, at least 5% lower, at least 10% lower, at least 15% lower, at least 20% lower, at least 25% lower, at least 30% lower, at least 35% lower, at least 40% lower, or at least 50% lower than the CTE of the first metallic material of the first assembly component 102. In some embodiments, the CTE of the first material of the first sealing component 152 may be not greater than 95% lower, not greater than 90% lower, not greater than 85% lower, not greater than 80% lower, not greater than 75% lower, not greater than 65% lower, not greater than 60% lower, not greater than 55% lower, or not greater than 50% lower than the CTE of the first metallic material of the first assembly component. Further, it will be appreciated that the CTE of the first material of the first sealing component 152 may be between any of these minimum and maximum values, such as at least 5% lower to not greater than 95% lower, or even at least 20% lower to not greater than 30% lower than the CTE of the first metallic material of first assembly component 102.

In some embodiments, the CTE of the second material of the second sealing component 154 may be greater than the CTE of the second metallic material of the second assembly component 104 and lower than the CTE of the first metallic material of the first assembly component 102. Additionally, in some embodiments, the second material of the second sealing component 154 may comprise a nickel-molybdenum chromium alloy such as Haynes®242®, stainless steel, spring steel, steel, aluminum, zinc, copper, magnesium, tin, platinum, lead, iron, or bronze. Accordingly, the second material of the second sealing component 154 may be configured to expand and/or contract at a similar or relative rate with respect to second metallic material of the second assembly component 104.

In some embodiments, the CTE of the second material of the second sealing component 154 may be the same as, at least 5% greater, at least 10% greater, at least 15% greater, at least 20% greater, at least 25% greater, at least 30% greater, at least 35% greater, at least 40% greater, at least 45% greater, at least 50% greater, at least 55% greater, at least 60% greater, at least 65% greater, at least 70% greater, or at least 75% greater than the CTE of the second metallic material of the second assembly component 104. In some embodiments, the CTE of the second material of the second sealing component 154 may be not greater than 100% greater, not greater than 95% greater, not greater than 90% greater, not greater than 85% greater, not greater than 80% greater, or not greater than 75% greater than the CTE of the second metallic material of second assembly component 104. Further, it will be appreciated that the CTE of the second material of the second sealing component 154 may be between any of these minimum and maximum values, such as at least 5% greater to not greater than 95% greater, or even at least 65% greater to not greater than 75% greater than the CTE of the second metallic material of second assembly component 104.

Figure 2:
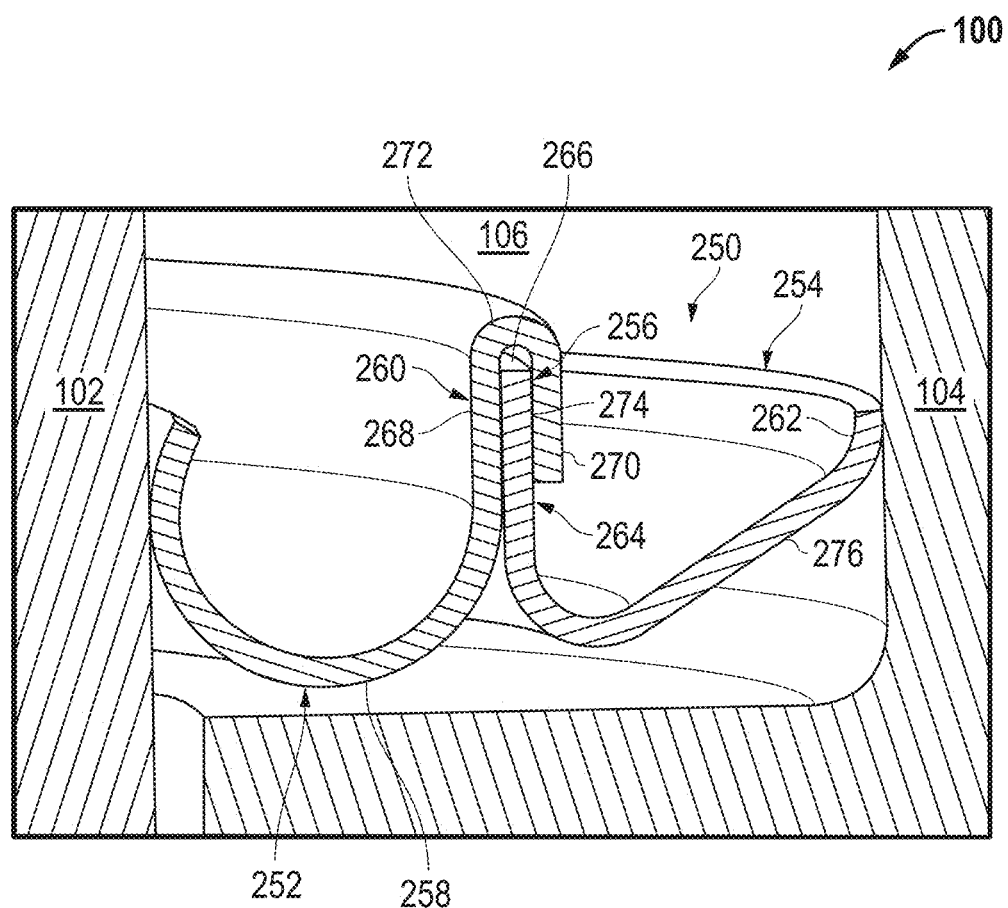
FIG. 2 is a cross-sectional view of an assembly having an annular bimetallic seal according to an embodiment of the disclosure.

FIG. 2 is a partial cross-sectional view of an assembly 100 having an annular bimetallic seal 250 according to an embodiment of the disclosure. The seal 250 may generally be substantially similar to the seal 150 and comprise a first sealing component 252, a second sealing component 254, and a joint 256 formed between the first sealing component 252 and the second sealing component 254. The first sealing component 252 may generally comprise an arcuate portion 258 that forms the radial seal with the first assembly component 102 and a joint feature 260. The second sealing component 254 may generally comprise an arcuate portion 262 that forms the radial seal with the second assembly component 104 and a joint feature 264. Additionally, in some embodiments, the second sealing component 254 may comprise a linear portion 276 disposed between the arcuate portion 262 and the joint feature 264. However, in some embodiments, the first sealing component 252 may comprise a linear portion, substantially similar to linear portion 276, disposed between the arcuate portion 258 and the joint feature 260.

In some embodiments, the joint feature 260 of the first sealing component 252 may comprise a joint cavity 266 comprising opposing linear legs 268, 270 joined by an arcuate bend 272, and the joint feature 264 of the second sealing component 254 may comprise a joint leg 274 received within the joint cavity 266 to form the joint 256. However, in alternative embodiments, the joint features 260, 264 may be reversed such that the first sealing component 252 comprises the joint feature 264, and the second sealing component 254 comprises the joint feature 260. Furthermore, it will be appreciated that the seal 250 may be formed from a bimetallic construction to compensate for the difference in thermal expansion properties of the respective mating components 102, 104 of the assembly 100 in a substantially similar manner as the seal 150. The joint 256 may also be formed in a substantially similar manner to those disclosed with reference to the seal 150.

Figure 3:
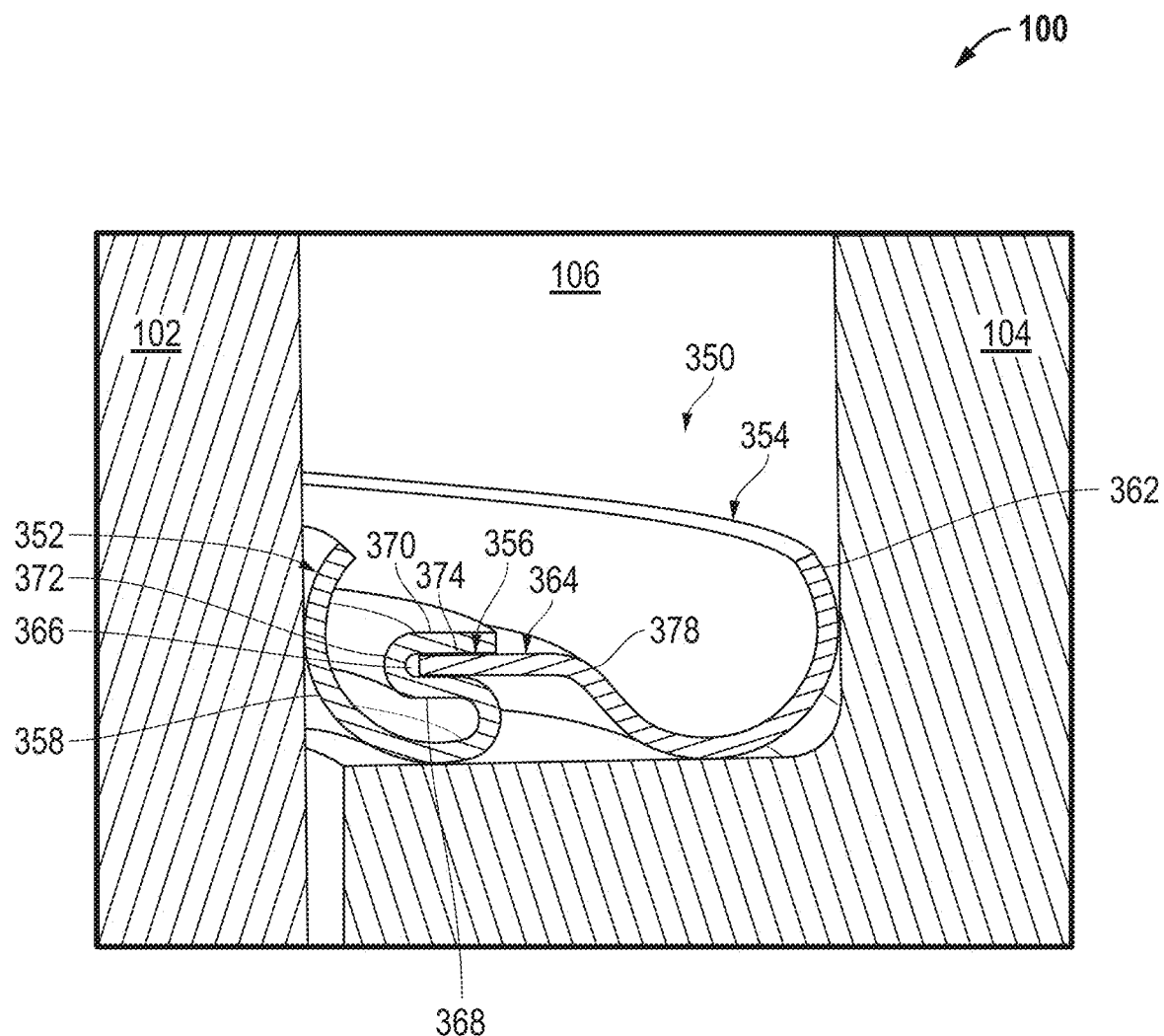
FIG. 3 is a cross-sectional view of an assembly having an annular bimetallic seal according to an embodiment of the disclosure.

FIG. 3 is a partial cross-sectional view of an assembly 100 having an annular bimetallic seal 350 according to an embodiment of the disclosure. The seal 350 may generally be substantially similar to the seal 150 and comprise a first sealing component 352, a second sealing component 354, and a joint 356 formed between the first sealing component 352 and the second sealing component 354. The first sealing component 352 may generally comprise an arcuate portion 358 that forms the radial seal with the first assembly component 102 and a joint feature 360. In some embodiments, the arcuate portion 358 may comprise a variable radius, such that the joint feature is oriented substantially radially and/or the joint cavity 366 is open towards the second assembly component 104. The second sealing component 354 may generally comprise an arcuate portion 362 that forms the radial seal with the second assembly component 104 and a joint feature 364. Additionally, in some embodiments, the second sealing component 354 may comprise an opposing arcuate portion 378 disposed between the arcuate portion 362 and the joint feature 364, such that the joint leg 374 is oriented substantially radially and/or extends towards the first assembly component 102.

In some embodiments, the joint feature 360 of the first sealing component 352 may comprise a joint cavity 366 comprising opposing linear legs 368, 370 joined by an arcuate bend 372, and the joint feature 364 of the second sealing component 354 may comprise a joint leg 374 received within the joint cavity 366 to form the joint 356. In some embodiments, the joint 356 may be oriented substantially radially. However, in alternative embodiments, the joint features 360, 364 may be reversed such that the first sealing component 352 comprises the joint feature 364, and the second sealing component 354 comprises the joint feature 360. Furthermore, it will be appreciated that the seal 350 may be formed from a bimetallic construction to compensate for the difference in thermal expansion properties of the respective mating components 102, 104 of the assembly 100 in a substantially similar manner as one or more of the seals 150. The joint 356 may also be formed in a substantially similar manner to those disclosed with reference to the seal 150. Alternative embodiments of the seal 350 may comprise any number or arcuate convolutions and/or linear portions to create a bimetallic seal suitable for operation in the assembly 100.

Figure 4:
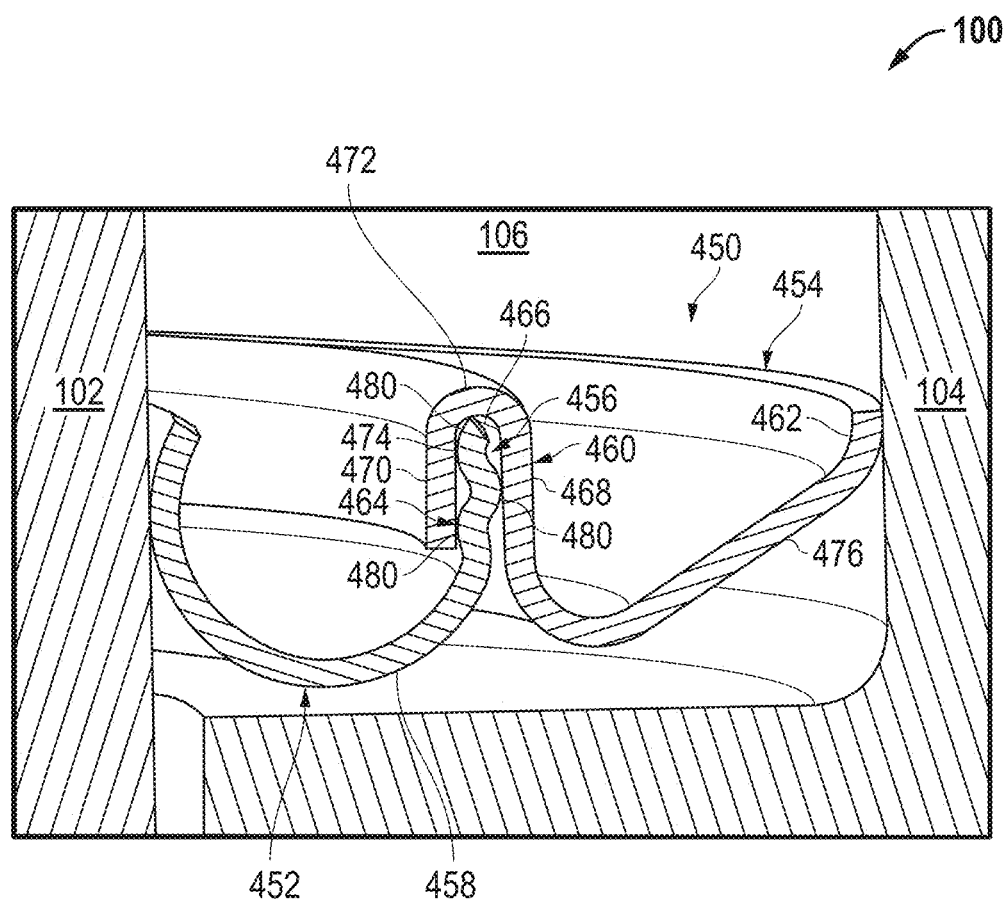
FIG. 4 is a cross-sectional view of an assembly having an annular bimetallic seal according to an embodiment of the disclosure.

FIG. 4 is a partial cross-sectional view of an assembly 100 having an annular bimetallic seal 450 according to an embodiment of the disclosure.

The seal 450 may generally be substantially similar to one or more of the seals 150, 250 and comprise a first sealing component 452, a second sealing component 454, and a joint 456 formed between the first sealing component 452 and the second sealing component 454. The first sealing component 452 may generally comprise an arcuate portion 458 that forms the radial seal with the first assembly component 102 and a joint feature 464. The second sealing component 454 may generally comprise an arcuate portion 462 that forms the radial seal with the second assembly component 104 and a joint feature 460. Additionally, in some embodiments, the second sealing component 454 may comprise a linear portion 476 disposed between the arcuate portion 462 and the joint feature 460. However, in some embodiments, the first sealing component 252 may comprise a linear portion, substantially similar to linear portion 476, disposed between the arcuate portion 458 and the joint feature 464.

In some embodiments, the joint feature 464 of the first sealing component 452 may comprise a joint leg 474 having a plurality of opposing arcuate convolutions 480 that form sealing ridges about the circumference of the joint leg 474, and the joint feature 460 of the second sealing component 454 may comprise a joint cavity 466 comprising opposing linear legs 468, 470 joined by an arcuate bend 472. In some embodiments, the opposing arcuate convolutions 480 may strengthen the joint 456. In some embodiments, the joint 456 may be oriented substantially axially. However, in alternative embodiments, the joint features 460, 464 may be reversed such that the first sealing component 452 comprises the joint feature 460, and the second sealing component 454 comprises the joint feature 164, such as that shown with respect to the seal 250. Furthermore, it will be appreciated that the seal 450 may be formed from a bimetallic construction to compensate for the difference in thermal expansion properties of the respective mating components 102, 104 of the assembly 100 in a substantially similar manner as one or more of the seals 150, 250. The joint 456 may also be formed in a substantially similar manner to those disclosed with reference to the seal 150. Alternative embodiments of the seal 450 may comprise any number or arcuate convolutions and/or linear portions to create a bimetallic seal suitable for operation in the assembly 100.

Figure 5:
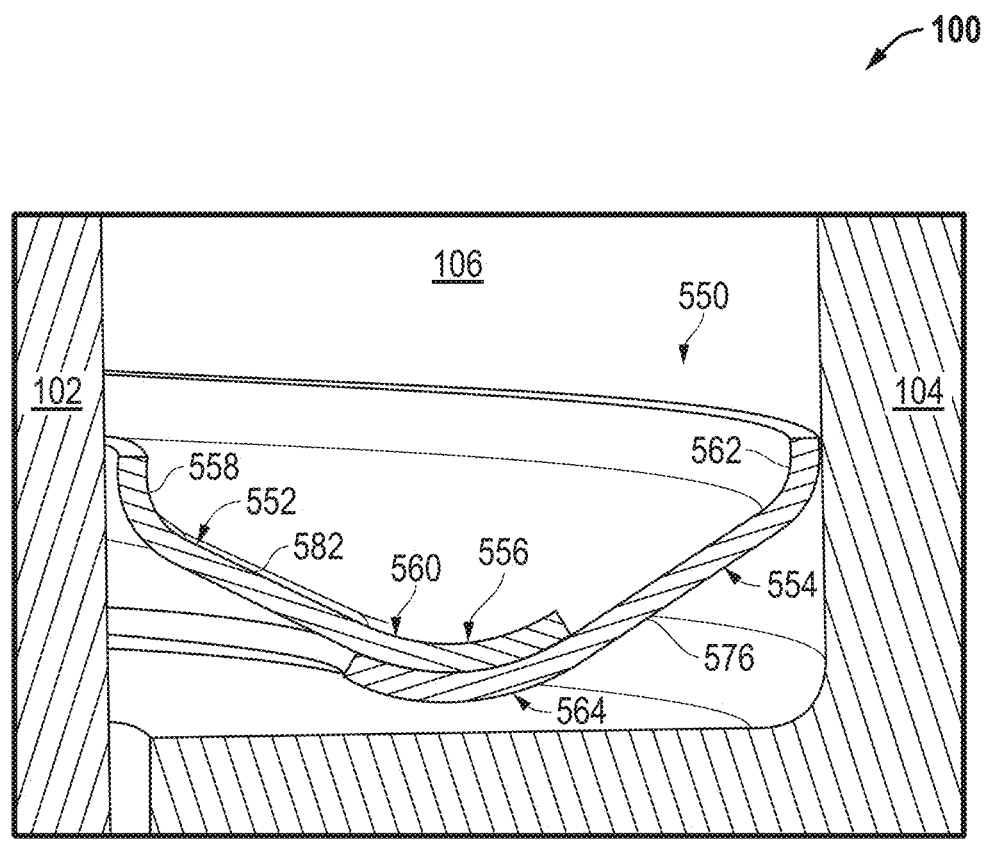
FIG. 5 is a cross-sectional view of an assembly having an annular bimetallic seal according to an embodiment of the disclosure.

FIG. 5 is a partial cross-sectional view of an assembly 100 having an annular bimetallic seal 550 according to an embodiment of the disclosure. The seal 550 may generally be substantially similar to the seal 150 and comprise a first sealing component 552, a second sealing component 554, and a joint 556 formed between the first sealing component 552 and the second sealing component 554. The first sealing component 552 may generally comprise an arcuate portion 558 that forms the radial seal with the first assembly component 102 and a joint feature 560. In some embodiments, the first sealing component 552 may also comprise a linear portion 582 disposed between the arcuate portion 558 and the joint feature 560. The second sealing component 554 may generally comprise an arcuate portion 562 that forms the radial seal with the second assembly component 104 and a joint feature 564. In some embodiments, the second sealing component 554 may comprise a linear portion 576 disposed between the arcuate portion 562 and the joint feature 564. However, in some embodiments, the first sealing component 552 and/or the second sealing component 554 may be free of the linear portion 580, 576, respectively.

In some embodiments, the joint feature 560 of the first sealing component 552 may comprise an arcuate joint portion, and the joint feature 564 of the second sealing component 554 may comprise a complementary arcuate joint portion. In some embodiments, the arcuate joint portion of the first sealing component 552 and the complementary arcuate joint portion of the second sealing component 554 may at least partially overlap. Accordingly, in some embodiments, each of the sealing components 552, 554 may comprise a uniform thickness. As such, in some embodiments, the overlapping arcuate joint portions of the first sealing component 552 and the second sealing component 554 may comprise a thickness that is greater than the thickness of the individual sealing components 552, 554. Furthermore, it will be appreciated that the seal 550 may be formed from a bimetallic construction to compensate for the difference in thermal expansion properties of the respective mating components 102, 104 of the assembly 100 in a substantially similar manner as the seal 150. The joint 556 may also be formed in a substantially similar manner to those disclosed with reference to the seal 150.

Figure 6:
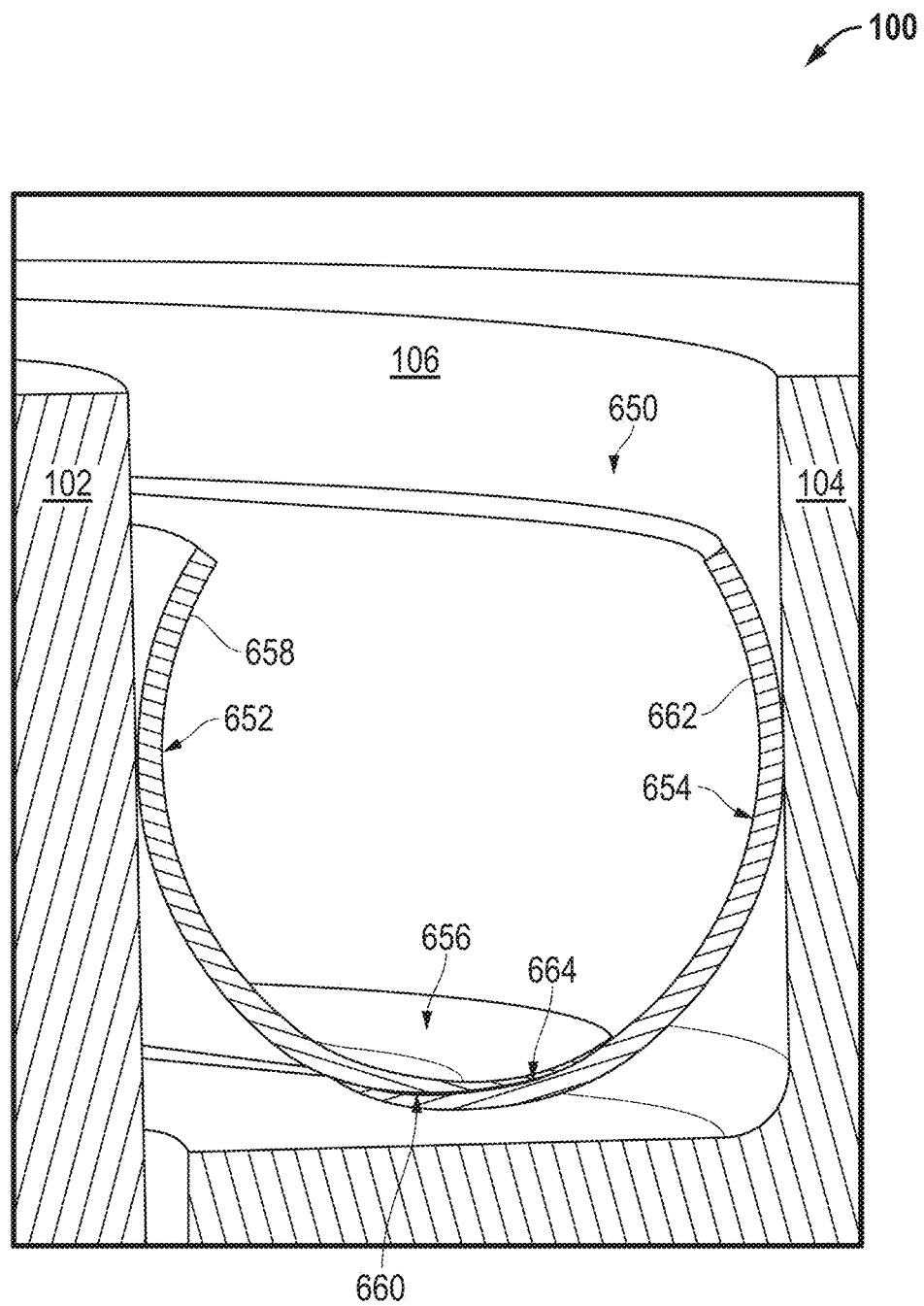
FIG. 6 is a cross-sectional view of an assembly having an annular bimetallic seal according to an embodiment of the disclosure.

FIG. 6 is a cross-sectional view of an assembly 100 having an annular bimetallic seal 650 according to an embodiment of the disclosure. The seal 650 may generally be substantially similar to one or more of the seals 150, 550 and comprise a first sealing component 652, a second sealing component 654, and a joint 656 formed between the first sealing component 652 and the second sealing component 654. The first sealing component 652 may generally comprise an arcuate portion 658 that forms the radial seal with the first assembly component 102 and a joint feature 560. The second sealing component 654 may generally comprise an arcuate portion 662 that forms the radial seal with the second assembly component 104 and a joint feature 664. However, in some embodiments, the first sealing component 652 and/or the second sealing component 654 may comprise a linear portion disposed between their respective arcuate portion 658, 662 and the joint feature 660, 664.

In some embodiments, the joint feature 660 of the first sealing component 652 may comprise an arcuate joint portion, and the joint feature 664 of the second sealing component 654 may comprise a complementary arcuate joint portion. In some embodiments, the arcuate joint portion of the first sealing component 652 and the complementary arcuate joint portion of the second sealing component 654 may at least partially overlap. Further, in some embodiments, the arcuate joint portion of the first sealing component 652 and the complementary arcuate joint portion of the second sealing component 654 may be tapered or arcuately tapered, such that the seal 650 may comprise a substantially uniform thickness. Furthermore, it will be appreciated that the seal 650 may be formed from a bimetallic construction to compensate for the difference in thermal expansion properties of the respective mating components 102, 104 of the assembly 100 in a substantially similar manner as one or more of the seals 150, 550. The joint 656 may also be formed in a substantially similar manner to those disclosed with reference to one or more of the seals 150, 550.

Figure 7:
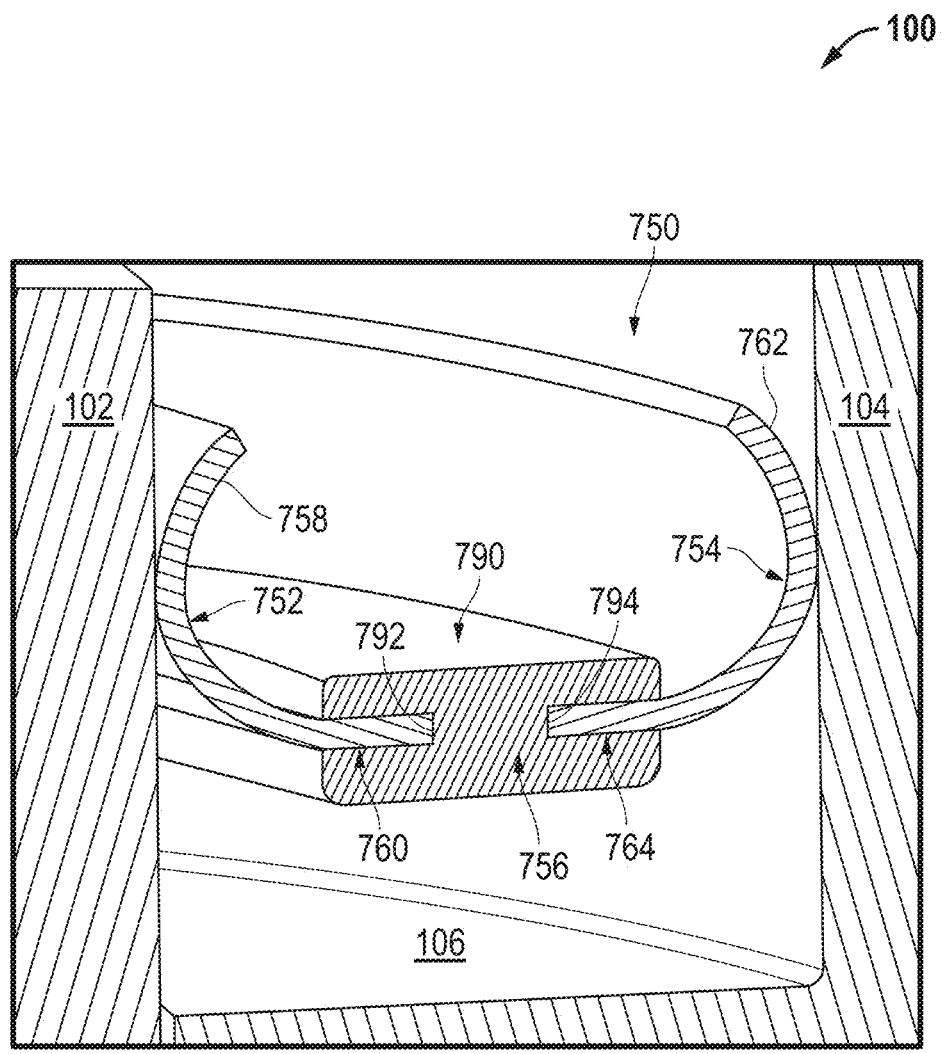
FIG. 7 is a cross-sectional view of an assembly having an annular bimetallic seal according to an embodiment of the disclosure.

FIG. 7 is a cross-sectional view of an assembly 100 having an annular bimetallic seal 750 according to an embodiment of the disclosure. The seal 750 may generally be substantially similar to the seal 150 and comprise a first sealing component 752, a second sealing component 754, and a joint 756 formed between the first sealing component 752 and the second sealing component 754. The first sealing component 752 may generally comprise an arcuate portion 758 that forms the radial seal with the first assembly component 102 and a joint feature 760. The second sealing component 754 may generally comprise an arcuate portion 762 that forms the radial seal with the second assembly component 104 and a joint feature 764. However, in some embodiments, the first sealing component 752 and/or the second sealing component 754 may comprise a linear portion disposed between their respective arcuate portion 758, 762 and the joint feature 760, 764.

In some embodiments, the joint feature 760 of the first sealing component 752 may comprise a linear joint portion, and the joint feature 764 of the second sealing component 754 may comprise a linear joint portion. Additionally, the joint 756 may comprise a retainer 790 having a first cavity 792 configured to at least partially receive the linear joint portion of the joint feature 760 of the first sealing component 752 and having a second cavity 794 opposite the first cavity 792 and configured to at least partially receive the linear joint portion of the joint feature 764 of the second sealing component 754. In some embodiments, the linear portion of the first sealing component 752 and the linear joint portion of the second sealing component 754 may be radially aligned. Accordingly, in some embodiments, the retainer 790 may be disposed at least partially radially between the first sealing component 752 and the second sealing component 754. Furthermore, it will be appreciated that the seal 750 may be formed from a bimetallic construction to compensate for the difference in thermal expansion properties of the respective mating components 102, 104 of the assembly 100 in a substantially similar manner as the seal 150. The joint 756 may also be formed in a substantially similar manner to those disclosed with reference to the seal 150.

Figure 8:
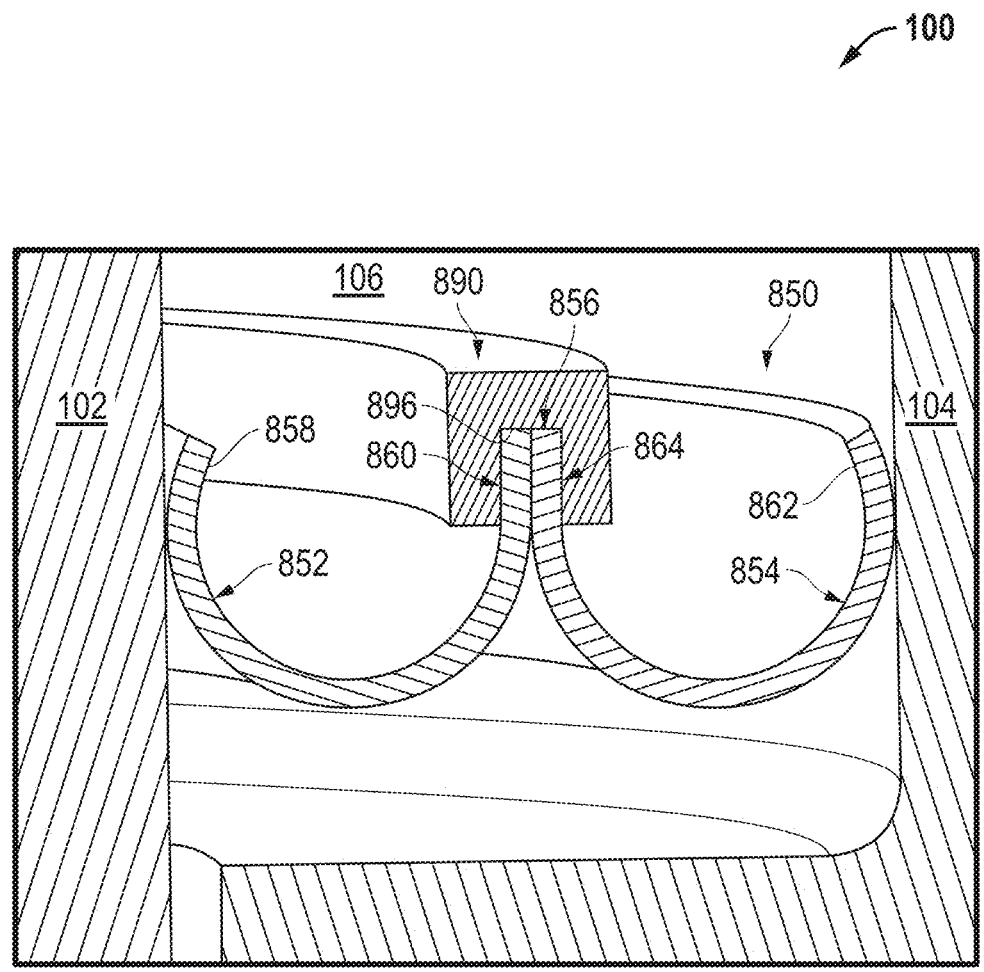
FIG. 8 is a cross-sectional view of an assembly having an annular bimetallic seal according to an embodiment of the disclosure.

FIG. 8 is a cross-sectional view of an assembly 100 having an annular bimetallic seal 850 according to an embodiment of the disclosure. The seal 850 may generally be substantially similar to one or more of the seals 150, 750 and comprise a first sealing component 852, a second sealing component 854, and a joint 856 formed between the first sealing component 852 and the second sealing component 854. The first sealing component 852 may generally comprise an arcuate portion 858 that forms the radial seal with the first assembly component 102 and a joint feature 860. The second sealing component 854 may generally comprise an arcuate portion 862 that forms the radial seal with the second assembly component 104 and a joint feature 864. However, in some embodiments, the first sealing component 852 and/or the second sealing component 854 may comprise a linear portion disposed between their respective arcuate portion 858, 862 and the joint feature 860, 864.

In some embodiments, the joint feature 860 of the first sealing component 852 may comprise a linear joint portion, and the joint feature 864 of the second sealing component 854 may comprise a linear joint portion. Additionally, the joint 856 may comprise a retainer 890 having a cavity 896 configured to at least partially receive the linear joint portion of the joint feature 860 of the first sealing component 852 and the linear joint portion of the joint feature 864 of the second sealing component 854. In some embodiments, the linear portion of the first sealing component 852 and the linear joint portion of the second sealing component 854 may be held in contact by the retainer 890. Furthermore, it will be appreciated that the seal 850 may be formed from a bimetallic construction to compensate for the difference in thermal expansion properties of the respective mating components 102, 104 of the assembly 100 in a substantially similar manner as one or more of the seals 150, 750. The joint 856 may also be formed in a substantially similar manner to those disclosed with reference to one or more of the seals 150, 750.

Figure 9:
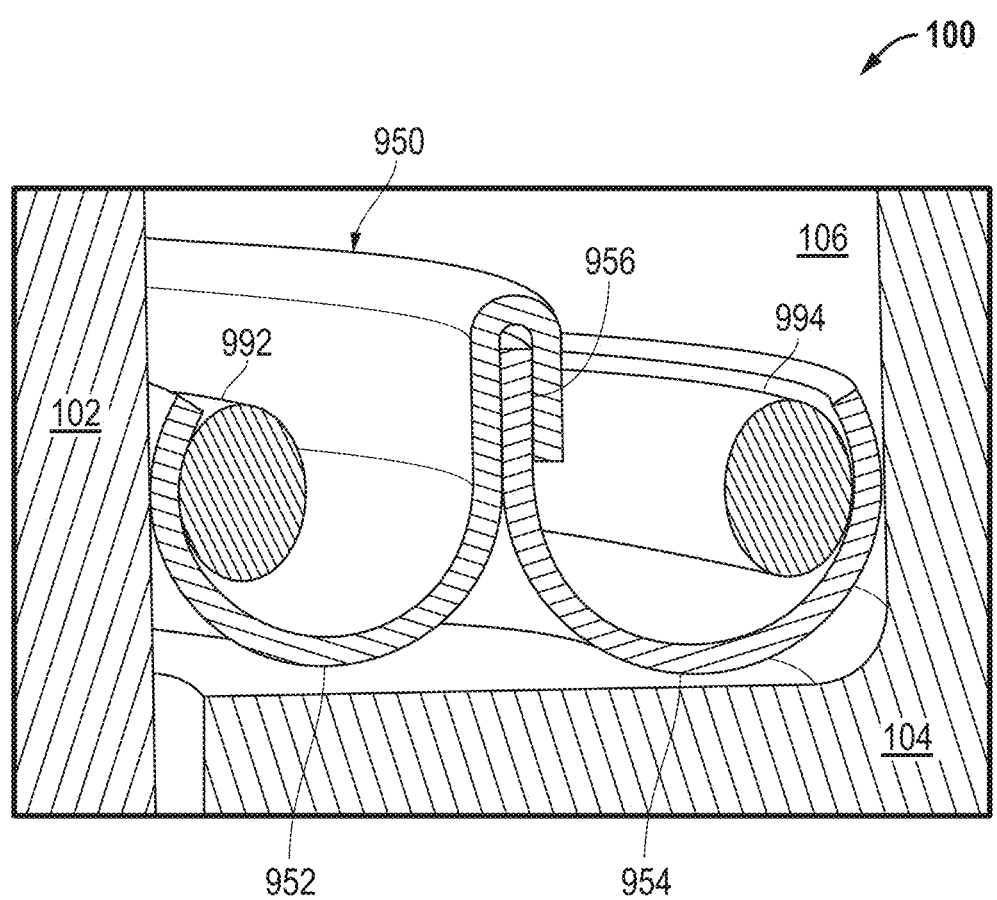
FIG. 9 is a cross-sectional view of an assembly having an annular bimetallic seal according to an embodiment of the disclosure.

FIG. 9 is a cross-sectional view of an assembly 100 having an annular bimetallic seal 950 according to an embodiment of the disclosure. The seal 950 may generally be representative of any of the seals 150, 250, 350, 450, 550, 650, 750, 850 disclosed herein and comprise a first sealing component 952, a second sealing component 954, and a joint 956. However, in some embodiments, the seal 950 may comprise one or more support rings 992, 994. In some embodiments, the seal 950 may comprise a support ring 992 disposed within the first sealing component 952. In some embodiments, the support ring 992 may be disposed adjacent to the inner diameter (ID) of the annulus 106 of the assembly 100. In some embodiments, the support ring 992 may generally be configured to exert a radial force on the first sealing component 952 towards the ID. In some embodiments, the seal 950 may comprise a support ring 994 disposed within the second sealing component 954. In some embodiments, the support ring 994 may be disposed adjacent to the outer diameter (OD) of the annulus 106 of the assembly 100. In some embodiments, the support ring 994 may generally be configured to exert a radial force on the second sealing component 954 towards the OD. Further, in some embodiments, the seal 950 may comprise both support rings 992, 994.

In some embodiments, the support rings 992, 994 may comprise a solid ring. In some embodiments, the support rings 992, 994 may comprise a hollow ring. In some embodiments, the support rings 992, 994 may comprise a "key-ring" spring or other resilient spring. Further, in some embodiments, the support rings 992, 994 may comprise any combination of solid rings, hollow rings, key-ring springs, or other resilient springs. The support rings 992, 994 may generally be formed from a resilient metallic material, such as a nickel-molybdenum chromium alloy such as Haynes® 242®, stainless steel, spring steel, steel, aluminum, zinc, copper, magnesium, tin, platinum, lead, iron, or bronze. In some embodiments, the support rings 992, 994 may comprise a coating and/or a surface treatment, such as a nitriding or carbon nitriding surface treatment.

In some embodiments, the support ring 992 may be formed from the same material as the first assembly component 102, the first sealing component 952, or a combination thereof. In some embodiments, the support ring 994 may be formed from the same material as the second assembly component 104, the second sealing component 954, or a combination thereof. For example, if the first assembly component 102 is formed from a 300 series stainless steel, the support ring 992 may also be formed from a 300 series stainless steel. In some embodiments, the support ring 992 may be formed from a different material as the first assembly component 102, the first sealing component 952, or a combination thereof. In some embodiments, the support ring 994 may be formed from a different material as the second assembly component 104, the second sealing component 954, or a combination thereof. For example, if the first assembly component 102 is formed from a 300 series stainless steel, the support ring 992 may be formed from 718 stainless steel. Accordingly, it will be appreciated that the support rings 992, 994 may comprise a substantially similar CTE as one or more of their respective components 102, 952, 104, 954 in order to function in accordance with embodiments of the seals 150, 250, 350, 450, 550, 650, 750, 850 disclosed herein.

The support rings 992, 994 may generally be utilized when the first assembly component 952 and/or the second assembly component 954 is formed from a material that does not provide enough strength, such as a 300 series stainless steel. This may arise when the material of the first sealing component 952 and/or the second sealing component 952 is selected based on CTE. As disclosed herein, the material may be selected based on CTE to closely align the CTE of the various assembly components 102, 104 and the respective sealing components 952, 954. The support rings 992, 994 may therefore provide the seal 950 with an increased stiffness while also allowing the seal to reliably perform at elevated temperatures, such as temperatures of at least 1000 degrees Fahrenheit (about 535 degrees Celsius) or higher.

Embodiments of the seal 150, 250, 350, 450, 550, 650, 750, 850, 950 may comprise any dimensions suitable for a particular application in the assembly 100. In some embodiments, the ID of the annulus 106 and/or ID of the bimetallic seal 150, 250, 350, 450, 550, 650, 750, 850, 950 may be at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, or even greater. In some embodiments, the OD of the annulus 106 and/or the OD of the bimetallic seal 150, 250, 350, 450, 550, 650, 750, 850, 950 may be at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, at least 1000 mm, or even greater.

Figure 10:
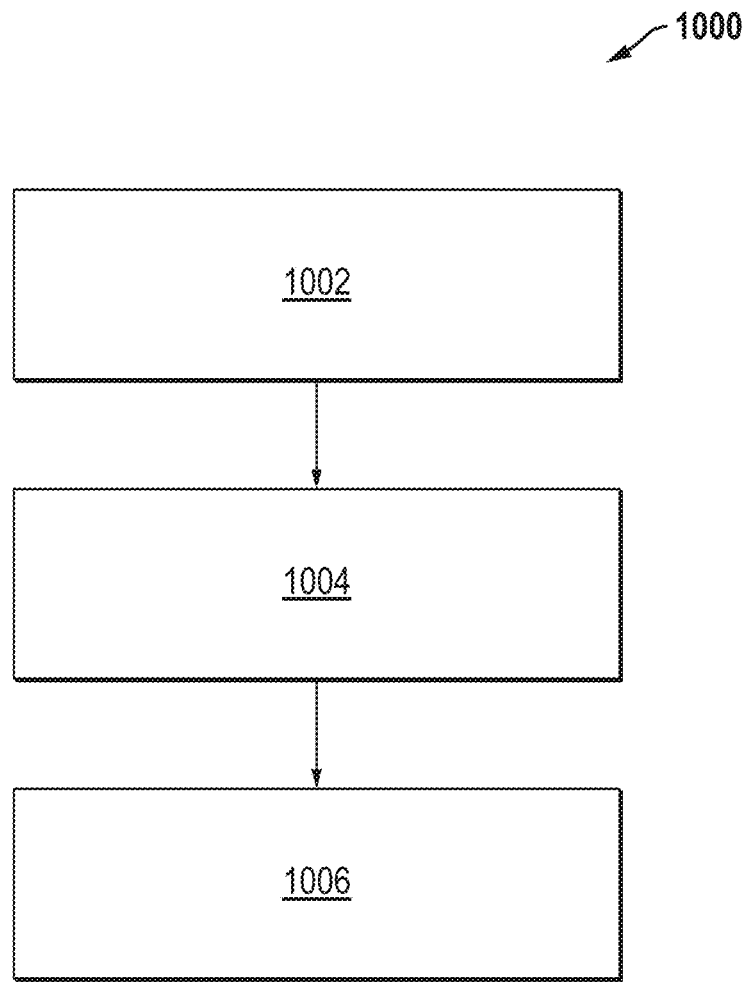
FIG. 10 is a flowchart of a method of forming an annular bimetallic seal according to an embodiment of the disclosure.

FIG. 10 is a flowchart of a method 1000 of forming an annular bimetallic seal 150, 250, 350, 450, 550, 650, 750, 850, 950 according to an embodiment of the disclosure. The method 1000 may begin at block 1002 by forming a first sealing component 152, 252, 352, 452, 552, 652, 752, 852. In some embodiments, forming the first sealing component 152, 252, 352, 452, 552, 652, 752, 852 may comprise 3D printing the first sealing component 152, 252, 352, 452, 552, 652, 752, 852. The method 1000 may continue at block 1004 by forming a second sealing component 154, 254, 354, 454, 554, 654, 754, 854. In some embodiments, forming the second sealing component may comprise 3D printing the second sealing component. The method 1000 may continue at block 1006 by forming a joint 156, 256, 356, 456, 556, 656, 756, 856 between the first sealing component 152, 252, 352, 452, 552 and the second sealing component 154, 254, 354, 454, 554. In some embodiments, forming the joint 156, 256, 356, 456, 556, 656, 756, 856 between the first sealing component 152, 252, 352, 452, 552, 652, 752, 852 and the second sealing component 154, 254, 354, 454, 554, 654, 754, 854 may comprise ultrasonic welding the first sealing component 152, 252, 352, 452, 552, 652, 752, 852 to the second sealing component 154, 254, 354, 454, 554, 654, 754, 854, laser sintering the first sealing component 152, 252, 352, 452, 552, 652, 752, 852 to the second sealing component 154, 254, 354, 454, 554, 654, 754, 854, mechanical crimping the first sealing component 152, 252, 352, 452, 552, 652, 752, 852 to the second sealing component 154, 254, 354, 454, 554, 654, 754, 854, cold rolling (coulomb bonding) the first sealing component 152, 252, 352, 452, 552, 652, 752, 852 to the second sealing component 154, 254, 354, 454, 554, 654, 754, 854, braising the first sealing component 152, 252, 352, 452, 552, 652, 752, 852 to the second sealing component 154, 254, 354, 454, 554, 654, 754, 854, 3D printing the first sealing component 152, 252, 352, 452, 552, 652, 752, 852 or the second sealing component 154, 254, 354, 454, 554 654, 754, 854 about the other, or a combination thereof.

In some embodiments, the method 1000 may also comprise installing the bimetallic seal 150, 250, 350, 450, 550, 650, 750, 850 between a first assembly component 102 and a second assembly component 104 formed from different metallic materials, such that the first sealing component 152, 252, 352, 452, 552, 652, 752, 852, forms a radial seal with the first assembly component 102 and the second sealing component 154, 254, 354, 454, 554, 654, 754, 854 forms a radial seal with the second assembly component 104. In some embodiments, the method 1000 may also comprise subjecting the bimetallic seal 150, 250, 350, 450, 550, 650, 750, 850, 950 to operating temperatures of at least 500 degrees Fahrenheit (about 260 degrees Celsius), at least 600 degrees Fahrenheit (about 315 degrees Celsius), at least 700 degrees Fahrenheit (about 370 degrees Celsius), at least 800 degrees Fahrenheit (about 425 degrees Celsius), at least 900 degrees Fahrenheit (about 480 degrees Celsius), or at least 1000 degrees Fahrenheit (about 535 degrees Celsius); and maintaining a fluid tight seal between the first assembly component 102 and the second assembly component 104.

Figure 11:
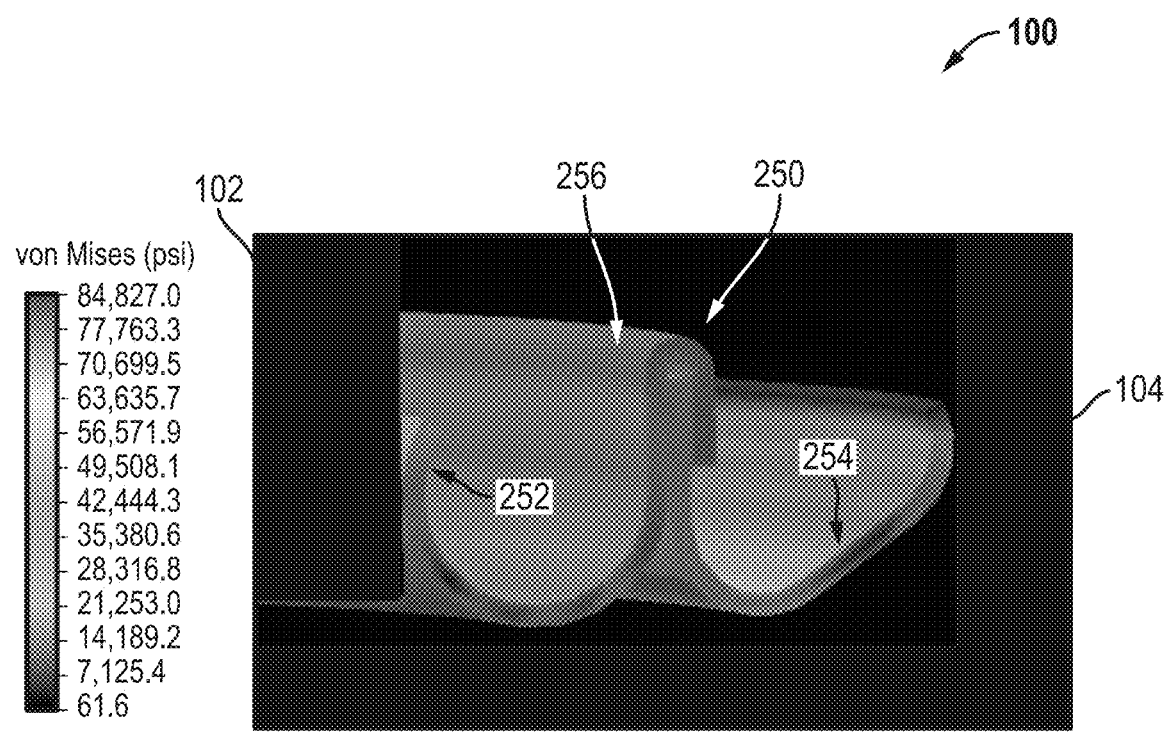
FIG. 11 is a cross-sectional view showing the stress distribution of an annular bimetallic seal disposed in an assembly according to an embodiment of the disclosure.

FIG. 11 is a cross-sectional view showing the stress distribution of an annular bimetallic seal 250 disposed in an assembly 100 according to an embodiment of the disclosure. While the seal 250 is depicted, it will be appreciated that the stress distribution of any of the embodiments of the seals 150, 350, 450, 550, 650, 750, 850, 950 may exhibit substantially similar performance. In the embodiment depicted, the first assembly component 102 may be formed from stainless steel 304 having a CTE of about 10 pin/in-° F., and the second assembly component 104 may be formed from titanium 6242 having a CTE of about 4 pin/in-° F. In an exemplary embodiment, the first sealing component 252 is formed from Inconel having a CTE of about 7.8 pin/in-° F., and the second sealing component may be formed from Haynes®242® having a CTE of 6.5 pin/in-° F. The exemplary embodiment was tested at 1000° F. Traditional seals formed from a homogenous metallic material that were tested in this manner may exceed 100,000 pounds per square inch (about 690 MPa) at the inner or outer sealing leg, while the other sealing leg may experience stress of about 50,000 psi (about 345 MPa), a difference of about 50,000 psi (about 345 MPa), which may result in loss of sealing and/or overall failure of the traditional seal.

The stress measured where the first sealing component 252 contacts the first assembly component 102 was about 46,000 psi (about 317 MPa), and the stress measured wherein the second sealing component 254 contacts the second assembly component 104 was about 53,000 psi (about 365 MPa). The stress in the joint 256 may also be some of the lowest stresses present in the seal 250. The difference in the stress is about 7,000 psi (about 48 MPa). At these operating temperatures, the seal 150, 250, 350, 450, 550, 650, 750, 850, 950 may maintain a proper radial seal between the first assembly component 102 and the second assembly component 104. This may be due in part to the stresses being substantially similar in each of the sealing components 252, 254 as shown. In some embodiments, a difference between the stress in the first sealing component 152, 252, 352, 452, 552, 652, 752, 852 and the stress in the second sealing component 154, 254, 354, 454, 554, 654, 754, 854 in a seal 150, 250, 350, 450, 550, 650, 750, 850, 950 may be not greater than 100 k psi (about 690 MPa), not greater than 90 k psi (about 620 MPa), not greater than 80 k psi (about 550 MPa), not greater than 70 k psi (about 480 MPa), not greater than 60 k psi (about 415 MPa), not greater than 50 k psi (about 345 MPa), not greater than 25 k psi (about 175 MPa), not greater than 20 k psi (about 140 MPa), not greater than 15 k psi (about 105 MPa), not greater than 10 k psi (about 70 MPa), not greater than 7 k psi (about 50 MPa), or not greater than 5 k psi (about 35 MPa). Thus, it will be appreciated that embodiments of the bimetallic seals 150, 250, 350, 450, 550, 650, 750, 850, 950 disclosed herein are suitable for providing a fluid tight seal at elevated temperatures in an annulus formed between differing metallic materials of mating components 102, 104 in an assembly 100 and may therefore compensate for the difference in thermal expansion properties of the respective mating components 102, 104 of the assembly 100.

Embodiments of the assembly 100, the annular bimetallic seal 150, 250, 350, 450, 550, 650, 750, 850, 950 and/or the method 1000 may include one or more of the following:

Embodiment 1. An annular bimetallic seal, comprising: a first sealing component formed from a first material; a second sealing component formed from a second material that is different than the first material; and a joint formed between the first sealing component and the second sealing component.

Embodiment 2. The bimetallic seal of embodiment 1, wherein the first sealing component is configured to form a radial seal with a first assembly component, and wherein the second sealing component is configured to form a radial seal with a second assembly component.

Embodiment 3. An assembly, comprising: a first assembly component; a second assembly component disposed about the first assembly component; and an annular bimetallic seal disposed between the first assembly component and the second assembly component, the seal comprising: a first sealing component formed from a first material and configured to form a radial seal with the first assembly component; a second sealing component formed from a second material that is different than the first material and configured to form a radial seal with the second assembly component; and a joint formed between the first sealing component and the second sealing component.

Embodiment 4. The bimetallic seal of any of embodiments 1 to 2 or the assembly of embodiment 3, wherein the first assembly component defines an inner diameter (ID) of an annulus, and wherein the second assembly component defines an outer diameter (OD) of an annulus.

Embodiment 5. The bimetallic seal or the assembly of any of embodiments 1 to 4, wherein the first sealing component comprises (1) an arcuate portion that forms the radial seal with the first assembly component and (2) a joint feature.

Embodiment 6. The bimetallic seal or the assembly of embodiment 5, wherein the first sealing component comprises a linear portion disposed between the arcuate portion and the joint feature.

Embodiment 7. The bimetallic seal or the assembly of any of embodiments 1 to 6, wherein the second sealing component comprises (1) an arcuate portion that forms the radial seal with the second assembly component and (2) a joint feature.

Embodiment 8. The bimetallic seal or the assembly of embodiment 7, wherein the second sealing component comprises a linear portion disposed between the arcuate portion and the joint feature.

Embodiment 9. The bimetallic seal or the assembly of any of embodiments 7 to 8, wherein the joint feature of the first sealing component is a joint cavity, and wherein the joint feature of the second sealing component is a joint leg received within the joint cavity to form the joint.

Embodiment 10. The bimetallic seal or the assembly of embodiment 9, wherein the joint leg is linear.

Embodiment 11. The bimetallic seal or the assembly of embodiment 9, wherein the joint leg comprises opposing arcuate convolutions that form ridges along a circumference of the joint leg.

Embodiment 12. The bimetallic seal or the assembly of any of embodiments 10 to 11, wherein the joint leg extends substantially axially or substantially radially.

Embodiment 13. The bimetallic seal or the assembly of any of embodiments 7 to 8, wherein the joint feature of the first sealing component comprises an arcuate joint portion, and wherein the joint feature of the second sealing component comprises a complementary arcuate joint portion, and wherein the arcuate joint portion and the complementary arcuate joint portion at least partially overlap.

Embodiment 14. The bimetallic seal or the assembly of any of embodiments 7 to 8, wherein the bimetallic seal comprises a retainer having a first cavity configured to at least partially receive the first sealing component and having a second cavity opposite the first cavity and configured to at least partially receive the second sealing component, and wherein the retainer is disposed at least partially radially between the first sealing component and the second sealing component.

Embodiment 15. The bimetallic seal or the assembly of embodiment 14, wherein the bimetallic seal comprises a retainer having a cavity configured to at least partially receive the first sealing component and the second sealing component, and wherein the first sealing component and the second sealing component are held in contact by the retainer.

Embodiment 16. The bimetallic seal or the assembly of any of embodiments 1 to 15, wherein the first assembly component is formed from a first metallic material, and wherein the second assembly component is formed from a second metallic material that is different than the first metallic material.

Embodiment 17. The bimetallic seal or the assembly of embodiment 16, wherein the coefficient of thermal expansion (CTE) of the first metallic material is different than the CTE of the second metallic material.

Embodiment 18. The bimetallic seal or the assembly of embodiment 17, wherein the CTE of the first metallic material is greater than the CTE of the second metallic material.

Embodiment 19. The bimetallic seal or the assembly of embodiment 18, wherein the first metallic material comprises steel or stainless steel.

Embodiment 20. The bimetallic seal or the assembly of embodiment 19, wherein the second metallic material comprises titanium or a titanium alloy.

Embodiment 21. The bimetallic seal or the assembly of any of embodiments 1 to 20, wherein the first material of the first sealing component is a metallic material, and wherein the second material of the second sealing component is a metallic material, and wherein the first material is different than the second material.

Embodiment 22. The bimetallic seal or the assembly of embodiment 21, wherein the coefficient of thermal expansion (CTE) of the first material of the first sealing component is different than the CTE of the second material of the second sealing component.

Embodiment 23. The bimetallic seal or the assembly of embodiment 22, wherein the CTE of the first material of the first sealing component is greater than the CTE of the second material of the second sealing component.

Embodiment 24. The bimetallic seal or the assembly of embodiment 23, wherein the CTE of the first material of the first sealing component is lower than the CTE of the first metallic material of the first assembly component and greater than the CTE of the second metallic material of the second assembly component.

Embodiment 25. The bimetallic seal or the assembly of embodiment 24, wherein the CTE of the second material of the second sealing component is greater than the CTE of the second metallic material of the second assembly component and lower than the CTE of the first metallic material of the first assembly component.

Embodiment 26. The bimetallic seal or the assembly of any of embodiments 21 to 25, wherein the first material of the first sealing component comprises a nickel-chromium based alloy such as Inconel®, a nickel-based alloy, nickel, titanium, or tungsten.

Embodiment 27. The bimetallic seal or the assembly of any of embodiments 21 to 26, wherein the second material of the second sealing component comprises a nickel-molybdenum chromium alloy such as Haynes®242®, stainless steel, spring steel, steel, aluminum, zinc, copper, magnesium, tin, platinum, lead, iron, or bronze.

Embodiment 28. The bimetallic seal or the assembly of any of embodiments 17 to 27, wherein the CTE of the first material of the first sealing component is same as, at least 5% lower, at least 10% lower, at least 15% lower, at least 20% lower, at least 25% lower, at least 30% lower, at least 35% lower, at least 40% lower, or at least 50% lower than the CTE of the first metallic material of the first assembly component.

Embodiment 29. The bimetallic seal or the assembly of any of embodiments 17 to 28, wherein the CTE of the first material of the first sealing component is be not greater than 95% lower, not greater than 90% lower, not greater than 85% lower, not greater than 80% lower, not greater than 75% lower, not greater than 65% lower, not greater than 60% lower, not greater than 55% lower, or not greater than 50% lower than the CTE of the first metallic material of the first assembly component.

Embodiment 30. The bimetallic seal or the assembly of any of embodiments 17 to 29, wherein the CTE of the second material of the second sealing component is the same as, at least 5% greater, at least 10% greater, at least 15% greater, at least 20% greater, at least 25% greater, at least 30% greater, at least 35% greater, at least 40% greater, at least 45% greater, at least 50% greater, at least 55% greater, at least 60% greater, at least 65% greater, at least 70% greater, or at least 75% greater than the CTE of the second metallic material of the second assembly component.

Embodiment 31. The bimetallic seal or the assembly of any of embodiments 17 to 30, wherein the CTE of the second material of the second sealing component is not greater than 100% greater, not greater than 95% greater, not greater than 90% greater, not greater than 85% greater, not greater than 80% greater, or not greater than 75% greater than the CTE of the second metallic material of second assembly component.

Embodiment 32. The bimetallic seal or the assembly of any of embodiments 1 to 31, wherein the joint is formed by ultrasonic welding, laser sintering, mechanical crimping, cold rolling (coulomb bonding), braising, 3D printing, or a combination thereof.

Embodiment 33. The bimetallic seal or the assembly of embodiment 32, wherein the joint is void of a leakage path.

Embodiment 34. The bimetallic seal or assembly of any of embodiments 4 to 33, wherein the ID of the annulus is at least 5 mm, at least 6 mm, at least 7 mm, at least 8 mm, at least 9 mm, at least 10 mm, at least 25 mm, at least 50 mm, at least 75 mm, at least 100 mm, at least 150 mm, at least 200 mm, at least 250 mm, at least 300 mm, at least 500 mm, or even greater.

Embodiment 35. The bimetallic seal or assembly of any of embodiments 4 to 34, wherein the OD of the annulus is at least 10 mm, at least 11 mm, at least 12 mm, at least 13 mm, at least 14 mm, at least 15 mm, at least 25 mm, at least 50 mm, at least 75 mm, at least 100 mm, at least 150 mm, at least 200 mm, at least 250 mm, at least 300 mm, at least 500 mm, at least 1000 mm, or even greater.

Embodiment 36. The bimetallic seal or assembly of any of embodiments 1 to 35, wherein the bimetallic seal is suitable for maintaining a fluid tight seal between the first assembly component and the second assembly component at operating temperatures of at least 500 degrees Fahrenheit (about 260 degrees Celsius), at least 600 degrees Fahrenheit (about 315 degrees Celsius), at least 700 degrees Fahrenheit (about 370 degrees Celsius), at least 800 degrees Fahrenheit (about 425 degrees Celsius), at least 900 degrees Fahrenheit (about 480 degrees Celsius), or at least 1000 degrees Fahrenheit (about 535 degrees Celsius).

Embodiment 37. The bimetallic seal or the assembly of any of embodiments 1 to 36, wherein a difference between the stress in the first sealing component and the stress in the second sealing component is not greater than 100 k psi (about 690 MPa), not greater than 90 k psi (about 620 MPa), not greater than 80 k psi (about 550 MPa), not greater than 70 k psi (about 480 MPa), not greater than 60 k psi (about 415 MPa), not greater than 50 k psi (about 345 MPa), not greater than 25 k psi (about 175 MPa), not greater than 20 k psi (about 140 MPa), not greater than 15 k psi (about 105 MPa), not greater than 10 k psi (about 70 MPa), or not greater than 5 k psi (about 35 MPa).

Embodiment 38. A method of forming a seal, comprising: forming a first sealing component; forming a second sealing component; and joining the first sealing component and the second sealing component.

Embodiment 39. The method of embodiment 38, wherein forming the first sealing component comprises 3D printing the first sealing component.

Embodiment 40. The method of any of embodiments 38 to 39, wherein forming the second sealing component comprises 3D printing the second sealing component.

Embodiment 41. The method of any of embodiments 38 to 40, wherein joining the first sealing component and the second sealing component comprises ultrasonic welding the first sealing component to the second sealing component, laser sintering the first sealing component to the second sealing component, mechanical crimping the first sealing component to the second sealing component, cold rolling (coulomb bonding) the first sealing component to the second sealing component, braising the first sealing component to the second sealing component, 3D printing the first sealing component or the second sealing component about the other, or a combination thereof.

Embodiment 42. The method of any of embodiments 38 to 41, wherein the first material is different than the second material.

Embodiment 43. The method of embodiment 42, wherein the coefficient of thermal expansion (CTE) of the first material of the first sealing component is different than the CTE of the second material of the second sealing component.

Embodiment 44. The method of embodiment 43, further comprising: installing the bimetallic seal between a first assembly component and a second assembly component formed from different metallic materials, such that the first sealing component forms a radial seal with the first assembly component and the second sealing component forms a radial seal with the second assembly component.

Embodiment 45. The method of embodiment 44, further comprising: subjecting the bimetallic seal to operating temperatures of at least 500 degrees Fahrenheit (about 260 degrees Celsius), at least 600 degrees Fahrenheit (about 315 degrees Celsius), at least 700 degrees Fahrenheit (about 370 degrees Celsius), at least 800 degrees Fahrenheit (about 425 degrees Celsius), at least 900 degrees Fahrenheit (about 480 degrees Celsius), or at least 1000 degrees Fahrenheit (about 535 degrees Celsius); and maintaining a fluid tight seal between the first assembly component and the second assembly component.

Embodiment 46. The method of any of embodiments 38 to 45, wherein a difference between the stress in the first sealing component and the stress in the second sealing component is not greater than 100 k psi (about 690 MPa), not greater than 90 k psi (about 620 MPa), not greater than 80 k psi (about 550 MPa), not greater than 70 k psi (about 480 MPa), not greater than 60 k psi (about 415 MPa), not greater than 50 k psi (about 345 MPa), not greater than 25 k psi (about 175 MPa), not greater than 20 k psi (about 140 MPa), not greater than 15 k psi (about 105 MPa), not greater than 10 k psi (about 70 MPa), or not greater than 5 k psi (about 35 MPa).

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An annular bimetallic seal, comprising:
a first sealing component formed from a first material;
a second sealing component formed from a second material that is different than the first material; and
a joint formed between the first sealing component and the second sealing component, wherein the first sealing component comprises (1) a first arcuate portion that forms the radial seal with a first assembly component and (2) a first joint feature, and wherein the second sealing component comprises (1) a second arcuate portion that forms the radial seal with a second assembly component and (2) a second joint feature, wherein the first arcuate portion directly contacts the first assembly component and the second arcuate portion directly contacts the second assembly component, and wherein the first sealing component comprises a first sealing component end portion and the second component comprises a second sealing component end portion, and wherein the first sealing component end portion and the second sealing component end portions are oriented in substantially the same axial direction.

2. The bimetallic seal of claim 1, wherein at least one of the first sealing component and the second sealing component comprises a linear portion disposed between the arcuate portion and the joint feature.

3. The bimetallic seal of claim 1, wherein at least one of the first joint feature and the second joint feature comprises a joint cavity, and wherein the other of the first joint feature and the second joint features comprises a joint leg received within the joint cavity to form the joint.

4. The bimetallic seal of claim 3, wherein the joint leg is linear, wherein the joint leg extends substantially axially or substantially radially, or a combination thereof.

5. The bimetallic seal of claim 3, wherein the joint leg comprises opposing arcuate convolutions that form ridges along a circumference of the joint leg.

6. The bimetallic seal of claim 1, wherein the bimetallic seal comprises a retainer having a first cavity configured to at least partially receive the first joint feature and having a second cavity opposite the first cavity and configured to at least partially receive the second joint feature, and wherein the retainer is disposed at least partially radially between the first sealing component and the second sealing component.

7. The bimetallic seal of claim 1, wherein the bimetallic seal comprises a retainer having a cavity configured to at least partially receive the first joint feature and the second joint feature, and wherein the first sealing component and the second sealing component are held in contact by the retainer.

8. The bimetallic seal of claim 1, wherein the first material of the first sealing component is a metallic material, and wherein the second material of the second sealing component is a metallic material, and wherein the first material is different than the second material.

9. The bimetallic seal of claim 8, wherein the coefficient of thermal expansion (CTE) of the first material of the first sealing component is different than the CTE of the second material of the second sealing component.

10. The bimetallic seal of claim 9, wherein the CTE of the first material of the first sealing component is greater than the CTE of the second material of the second sealing component.

11. The bimetallic seal of claim 10, wherein the first material of the first sealing component comprises a nickel-chromium based alloy such as a nickel-based alloy, nickel, titanium, or tungsten.

12. The bimetallic seal of claim 11, wherein the second material of the second sealing component comprises a nickel-molybdenum chromium alloy such as stainless steel, spring steel, steel, aluminum, zinc, copper, magnesium, tin, platinum, lead, iron, or bronze.

13. The bimetallic seal of claim 1, wherein the joint is void of a leakage path.

14. The bimetallic seal of claim 1, further comprising: a support ring or support spring disposed within at least one of the first sealing component and the second sealing component.

15. The bimetallic seal of claim 1, wherein the first sealing component is configured to form a radial seal with a first assembly component that defines an inner diameter (ID) of an annulus, wherein the second sealing component is configured to form a radial seal with a second assembly component that defines an outer diameter (OD) of an annulus, wherein the first assembly component is formed from a first metallic material, and wherein the second assembly component is formed from a second metallic material that is different than the first metallic material.

16. The bimetallic seal of claim 15, wherein the first metallic material comprises steel or stainless steel, and wherein the second metallic material comprises titanium or a titanium alloy.

17. The bimetallic seal of claim 16, wherein the CTE of the first material of the first sealing component is lower than the CTE of the first metallic material of the first assembly component and greater than the CTE of the second metallic material of the second assembly component.

18. The bimetallic seal of claim 17, wherein the CTE of the second material of the second sealing component is greater than the CTE of the second metallic material of the second assembly component and lower than the CTE of the first metallic material of the first assembly component.

\* \* \* \* \*